United States Patent
Tan et al.

(10) Patent No.: US 8,111,956 B2
(45) Date of Patent: Feb. 7, 2012

(54) METHOD AND APPARATUS FOR CONFIRMING OPTICAL FIBERS CONNECTION IN OPTICAL CONNECTOR

(75) Inventors: Khee Yen Serin Tan, Sakura (JP); Kazuhiro Takizawa, Sakura (JP); Daigo Saito, Sakura (JP)

(73) Assignee: Fujikura Ltd., Tokyo (JP)

( * ) Notice: Subject to any disclaimer, the term of this patent is extended or adjusted under 35 U.S.C. 154(b) by 25 days.

(21) Appl. No.: 12/488,832

(22) Filed: Jun. 22, 2009

(65) Prior Publication Data

US 2009/0317074 A1 Dec. 24, 2009

(30) Foreign Application Priority Data

Jun. 24, 2008 (JP) ................................. 2008-165009

(51) Int. Cl.
*G02B 6/28* (2006.01)

(52) U.S. Cl. ................. 385/24; 398/20; 385/30; 385/31

(58) Field of Classification Search .................... 385/24, 385/134, 70, 85, 87, 30, 31; 398/20
See application file for complete search history.

(56) References Cited

U.S. PATENT DOCUMENTS

| | | | |
|---|---|---|---|
| 4,983,007 A * | 1/1991 | James et al. ..................... 385/32 |
| 5,278,932 A * | 1/1994 | DeVeau et al. ................ 385/134 |
| 5,367,594 A * | 11/1994 | Essert et al. ..................... 385/70 |
| 5,857,045 A * | 1/1999 | Lee .................................. 385/70 |
| 6,186,672 B1 * | 2/2001 | Takizawa et al. ................ 385/85 |
| 7,264,401 B2 * | 9/2007 | Johnson ........................... 385/53 |
| 7,346,255 B2 | 3/2008 | Yamaguchi et al. |
| 7,467,896 B2 * | 12/2008 | Melton et al. .................. 385/87 |
| 2007/0104445 A1 * | 5/2007 | Larson et al. .................. 385/134 |
| 2007/0274657 A1 * | 11/2007 | Billman et al. ............... 385/134 |

FOREIGN PATENT DOCUMENTS

| | | |
|---|---|---|
| EP | 0 846 965 B1 | 3/2002 |
| JP | 2005-283954 A | 10/2005 |
| JP | 2005-292429 A | 10/2005 |
| JP | 2007225961 A | 9/2007 |
| WO | 2007/078551 A2 | 7/2007 |

* cited by examiner

*Primary Examiner* — Ellen Kim
(74) *Attorney, Agent, or Firm* — Sughrue Mion, PLLC

(57) ABSTRACT

Provided is a method for confirming optical fibers connection in a connection part in an optical connector, including: allowing light to pass through a first optical fiber and allowing cladding mode light to disappear; and detecting a difference in light intensity in the connection part between before and after the light from the first optical fiber enters a second optical fiber disposed in the optical connector.

10 Claims, 6 Drawing Sheets

METHOD AND APPARATUS FOR CONFIRMING OPTICAL FIBERS CONNECTION IN OPTICAL CONNECTOR

BACKGROUND OF THE INVENTION

1. Field of the Invention

The present invention relates to a method and an apparatus for confirming a connection state of optical fibers butted and connected to each other in a connector.

2. Description of the Related Art

Japanese Patent Application Laid-Open Publication No. 2005-292429 (Patent Document 1) discloses a method for confirming whether or not an optical fiber built in an optical connector and an optical fiber inserted into the optical connector are properly butted and connected to each other.

According to the method disclosed in Patent Document 1, as shown in FIG. 1A, an optical connector 115 is connected to an optical connector 101. A short optical fiber 116 for a test is attached to the optical connector 115. Light from a light source 117 passes through the optical fiber 116. Furthermore, the light from the optical fiber 116 enters one end of an optical fiber 102 built in the optical connector 101 and exits from the other end thereof.

The method described above uses an assembling tool (opening member) 118 having a light transmissive insertion member 111 integrally formed therein. The insertion member 111 stably opens a portion between a base 106 and covers 107 and 108 in the optical connector 101, and maintains the opened state. Note that, in the optical connector 101, a concave part 112 is formed by the base 106 and the covers 107 and 108. The insertion member 111 is inserted into the concave part 112 in a state where the concave part 112 faces downward. Since the insertion member 111 is light transmissive, light that exits from the optical fiber 102 is observed from the insertion member 111.

Next, as shown in FIG. 1B, an optical fiber 110 is inserted into the optical connector 101 so as to abut on the optical fiber 102. Note that FIG. 1B shows a state where a bare optical fiber 110a obtained by peeling off an external sheath of the optical fiber 110 faces the optical fiber 102. When the optical fiber 102 and the optical fiber 110 are in an appropriate connection state, most of the light from the optical fiber 102 enters the optical fiber 110. Thus, intensity of the light leaking from a connection part P is small.

On the other hand, when the connection state is incomplete, the light from the optical fiber 102 leaks from the connection part P. Therefore, the intensity of the light leaking from the connection part P is increased.

SUMMARY OF THE INVENTION

In the above method for confirming optical fibers connection, in the case of confirming a butt-connection state in a bright place, for example (a particularly bright place in the daytime, for example), a difference in brightness between good and bad butt-connection states may not be clear.

This is because the light entering the optical fiber from the light source enters not only a core but also a cladding, thereby generating cladding mode light. Specifically, the cladding mode light is easily emitted to the outside from the cladding of the optical fiber. Accordingly, even when the butt-connection state is good, the cladding mode light appears as background light, and makes it difficult to confirm the connection state.

The present invention has been made in consideration of the foregoing circumstances. It is an object of the present invention to provide a method and an apparatus for confirming a connection state of optical fibers connected in a connector even in a bright environment.

A first aspect of the present invention is a method for confirming optical fibers connection in a connection part in an optical connector, the method including: allowing light to pass through a first optical fiber while causing cladding mode light to disappear; and detecting a difference in light intensity in the connection part between before and after the light from the first optical fiber enters a second optical fiber disposed in the optical connector.

The first optical fiber may be bent when light passes therethrough.

It is preferable that a wavelength of light entering the first optical fiber is 650 nm and a length of the first optical fiber is 100 cm to 200 cm.

The first optical fiber may be a single-mode optical fiber.

It is preferable that the difference in light intensity is detected through a light transmissive member located in the connection part.

The optical connector may include a ferrule and a third optical fiber inserted into the ferrule. In this case, light that exits from the first optical fiber enters the second optical fiber through the third optical fiber.

The optical connector may have a connection mechanism extending in a direction opposite to that toward a connection end face of the ferrule. In this case, the connection mechanism includes: a base; first and second covers openably and closably facing the base; and a flat spring for elastically clamping the base and all the covers. Furthermore, a positioning groove for the optical fiber is formed in the base. The first cover is located so as to open and close the connection part. The second cover is located so as to cover a sheath portion of the second optical fiber. Moreover, the light transmissive member is an insertion member and is inserted between the base and the first and second covers so as to open and close the base and the covers.

The optical connector may have a connection mechanism extending in a direction opposite to that toward a connection end face of the ferrule. In this case, the connection mechanism includes: a base; first and second covers openably and closably facing the base; and a flat spring for elastically clamping the base and all the covers. Moreover, the light transmissive member is at least one of the base and the first cover. A positioning groove for the optical fiber is formed in the base. The first cover is located so as to open and close the connection part, and the second cover is located so as to cover a sheath portion of the second optical fiber.

The optical connector may include: a base; first, second, and third covers openably and closably facing the base; and a flat spring for elastically clamping the base and all the covers. In this case, a positioning groove for the optical fiber is formed in the base. Moreover, the first cover is located so as to open and close the connection part, the second cover is located so as to cover a sheath portion of the first optical fiber, and the third cover is located so as to cover a sheath portion of the second optical fiber. Furthermore, the light transmissive member is an insertion member and is inserted between the base and the first to third covers so as to open and close the base and the first, second and third covers.

The optical connector may include: a base; first, second, and third covers openably; and closably facing the base and a flat spring for elastically clamping the base and all the covers. In this case, a positioning groove for the optical fiber is formed in the base. Moreover, the first cover is located so as to open and close the connection part, the second cover is located so as to cover a sheath portion of the first optical fiber, and the third cover is located so as to cover a sheath portion of the second optical fiber. Furthermore, the light transmissive member is the base and the first cover.

A second aspect of the present invention is an apparatus for confirming optical fibers connection in an optical connector, apparatus including: a light source; an optical connector; an optical adapter configured to detachably hold the optical connector and another optical connector and to connect the optical connectors to each other; and an optical fiber connecting the light source to the optical connector. The optical fiber has a length enough to cause cladding mode light generated by light from the light source to disappear.

The optical fiber between the light source and the optical connector may be bent so as to enhance attenuation of the cladding mode light.

The light source may be a laser diode which emits light having a wavelength of 650 nm. It is preferable that the length of the optical fiber between the light source and the optical connector is 100 cm to 200 cm.

The optical fiber between the light source and the optical connector may be a single-mode optical fiber.

According to the present invention, in the butt-connection part of the optical fiber in the optical connector, the cladding mode light disappears. Accordingly, the difference in light intensity between before and after the abutting connection, which depends on the connection state, is emphasized. Thus, it is possible to clearly confirm the butt-connection state of the optical fibers even in a bright environment.

DESCRIPTION OF THE EMBODIMENTS

Figure 1A:
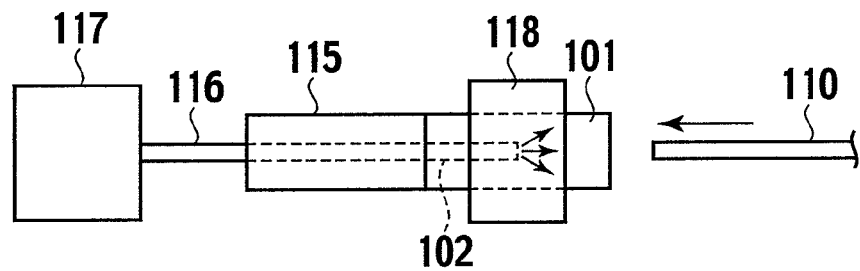
FIGS. 1A and 1B are views for explaining a conventional method for confirming a connection state of optical fibers in an optical connector, FIG. 1A showing a state before the optical fibers abut on each other, FIG. 1B showing a state after the optical fibers abut on each other.
Figure 1B:
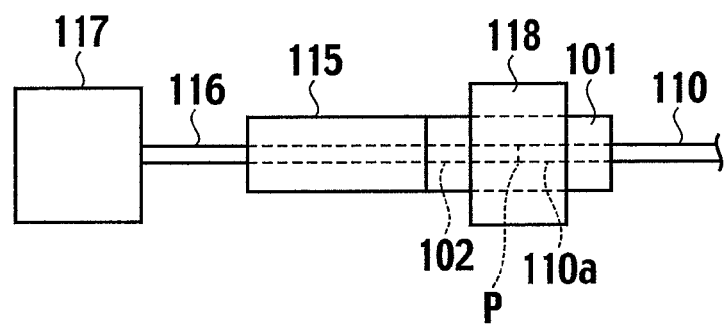
Figure 2:
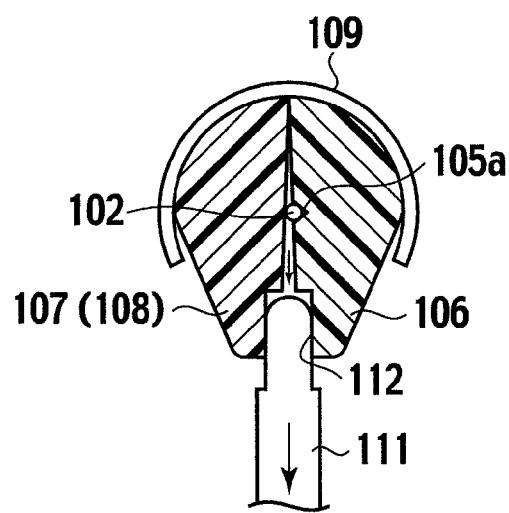
FIG. 2 is a cross-sectional view of a main part of the optical connector shown in FIGS. 1A and 1B, showing a situation where leak light is detected through an insertion member.
Figure 3:
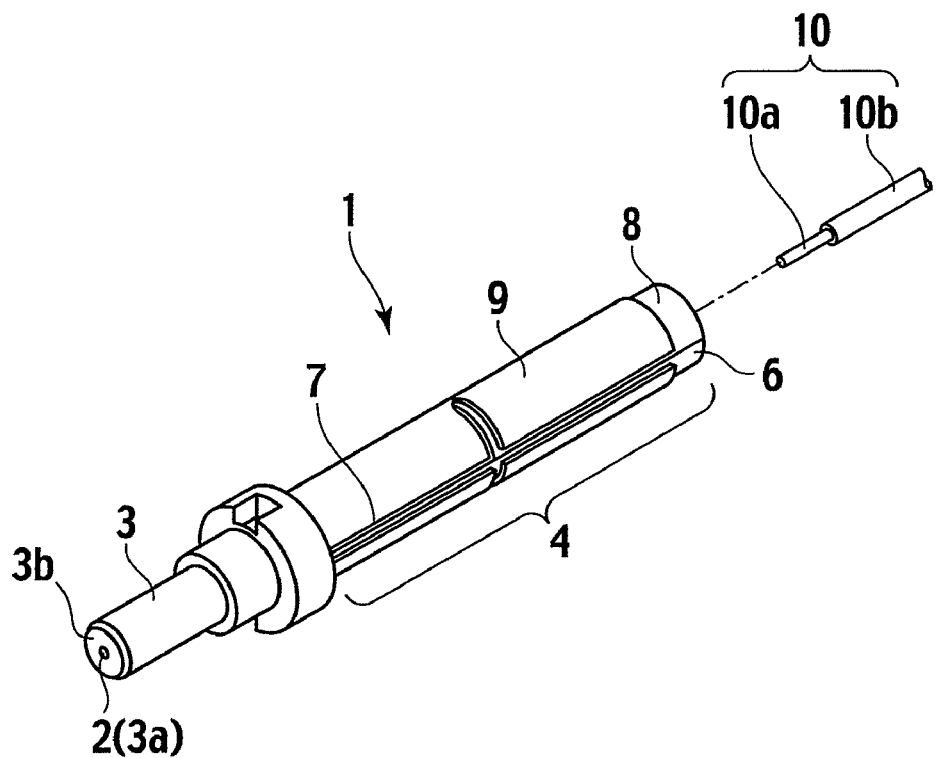
FIG. 3 is a perspective view of an optical connector according to an embodiment of the present invention.
Figure 4:
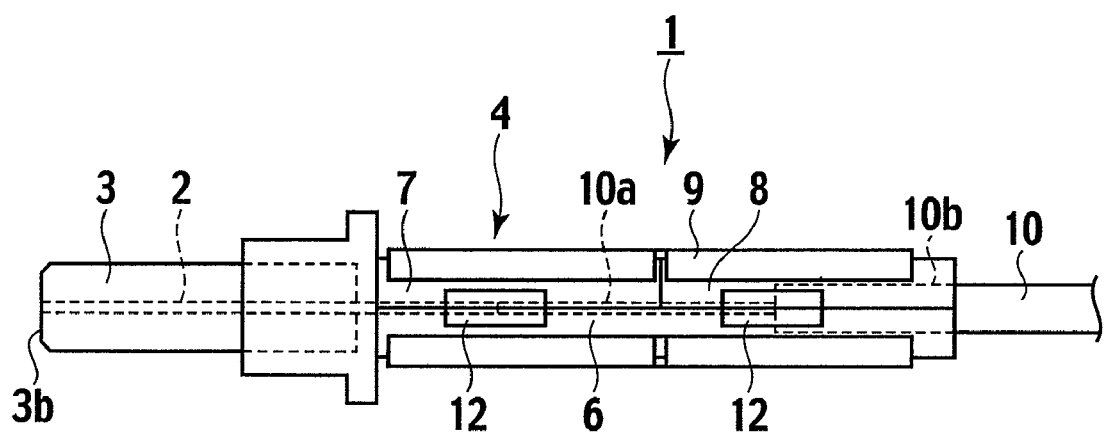
FIG. 4 is a side view of the optical connector shown in FIG. 3.
Figure 5:
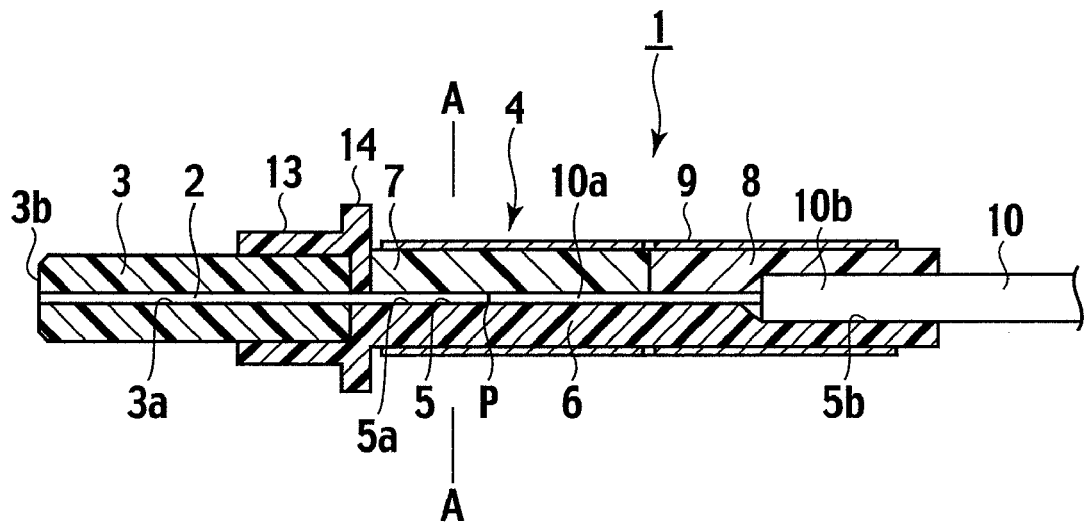
FIG. 5 is a longitudinal cross-sectional view of the optical connector shown in FIG. 3.

With reference to the drawings, description will be given below of a method and an apparatus for confirming optical fibers connection according to embodiments of the present invention.

First Embodiment

As shown in FIGS. 3 to 6, an optical connector 1 according to a first embodiment of the present invention includes: an optical fiber 2; a ferrule 3 having a connection end face 3b where an end face of the optical fiber 2 is exposed; and a connection mechanism 4 extending from the ferrule 3 in a direction opposite to the connection end face 3b. Note that, as the optical fiber 2 built in the optical connector 1, an optical fiber formed of only a core and a cladding, a so-called bare optical fiber is preferable.

The connection mechanism 4 includes: a base 6; covers 7 and 8 facing the base 6; and a flat spring 9 formed into, for example, a C-shape or squared C-shape for elastically clamping the covers 7 and 8. The base 6 is formed integrally with a cylindrical ferrule fitting part 13 and a brim-shaped flange part 14. The ferrule fitting part 13 is fitted to the ferrule 3. The base 6 extends from the flange part 14 in the direction opposite to the connection end face 3b of the ferrule 3.

Figure 6:
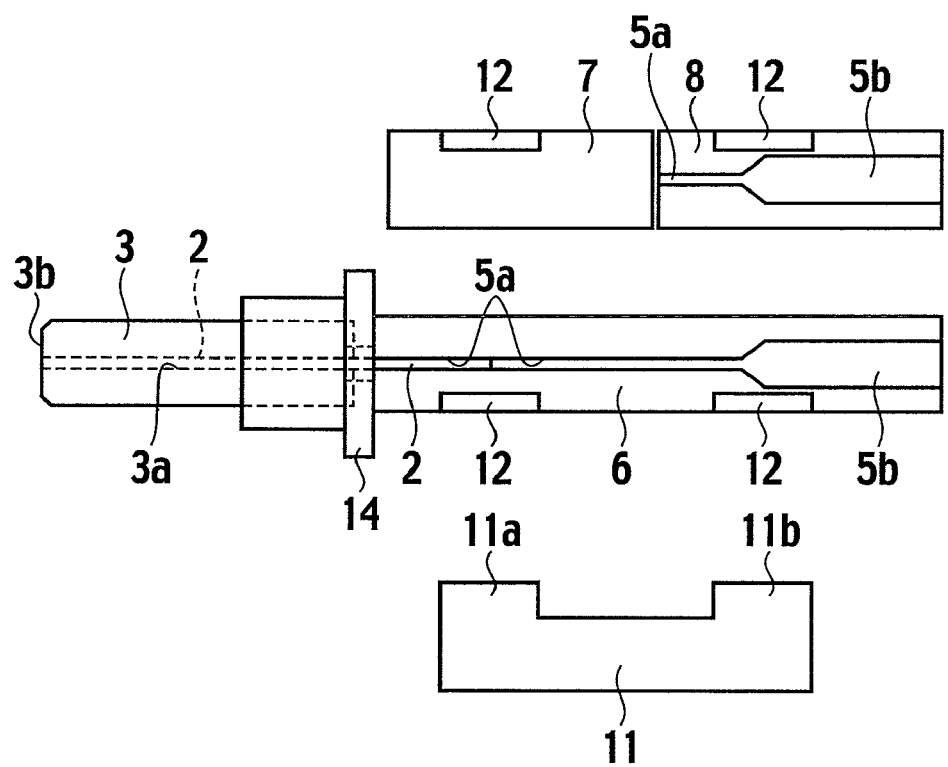
FIG. 6 is an exploded plan view of a main part of the optical connector shown in FIG. 3.

As shown in FIG. 6, in the base 6, a positioning groove 5 is formed, which is continuous with an optical fiber insertion hole 3a in the ferrule 3. The positioning groove 5 is constituted of a positioning groove 5a and a positioning groove 5b. The positioning groove 5a is formed so as to accommodate the optical fiber 2 and an optical fiber 10a which are butted and connected to each other. The positioning groove 5b is formed so as to accommodate a sheath portion 10b of an optical fiber 10 to be inserted into the optical connector 1.

The cover 7 is positioned so as to open and close a butt-connection part P of the optical fibers. In other words, the cover 7 is positioned so as to cover the butt-connection part P. The cover 8 is positioned so as to open and close the sheath portion 10b of the optical fiber 10. In other words, the cover 8 is positioned so as to cover the sheath portion 10b. An insertion member 11 is formed in a wedge shape and opens and closes the covers 7 and 8 with respect to the base 6 against reaction force of the flat spring 9. In the base 6 and the covers 7 and 8, concave parts 12 are formed, into which the insertion member 11 is inserted when the base 6 and the covers 7 and 8 face each other. Note that the insertion member 11 is used for installation of the optical connector.

The optical connector 1 can also clamp the sheath portion 10b of the optical fiber 10. Note that this optical connector is also called a Field-Installable Connector since field installation thereof is easy.

In installation of the optical connector 1, first, the insertion member 11 is inserted into the concave parts 12 formed between the base 6 and the covers 7 and 8. Thus, the covers 7 and 8 are slightly opened. In this state, the optical fiber 10 is inserted from the outside and then the optical fiber 2 and the bare optical fiber 10a of the optical fiber 10 are allowed to abut on each other. Note that a tip of the optical fiber 10 has its sheath previously peeled off and the bare optical fiber 10a is exposed. Next, after connection is confirmed, the insertion member 11 is removed and the butt-connection part P of the optical fibers as well as the sheath portion 10b of the optical fiber 10 are sandwiched between the base 6 and the covers 7 and 8 by using the flat spring 9. Note that, as a drive mechanism of the insertion member 11, drive mechanisms disclosed in Patent Document 1 and U.S. Pat. No. 7,346,255 can be suitably used. This drive mechanism is also called a wedge unit. In this case, the insertion member 11, as one of assembling tools, stably maintains an opened state between the base 6 and the covers 7 and 8 without being touched.

In this embodiment, the insertion member 11 is made of a light transmissive material. However, as described later, the member made of the light transmissive material is not limited to the insertion member 11.

As shown in FIG. 6, the insertion member 11 integrally includes wedge parts 11a and 11b. The wedge part 11a is used to open the cover 7. The wedge part 11b is used to open the cover 8. Specifically, the wedge parts 11a and 11b are inserted into the concave parts 12 defined between the base 6 and the covers 7 and 8.

FIG. 6 shows surfaces of the respective covers 7 and 8 facing the base 6. The surface of the cover 7 facing the base 6 is flat. On the other hand, in the surface of the cover 8 facing the base 6, the positioning groove 5a configured to receive the bare optical fiber 10a of the optical fiber 10 and the positioning groove 5b configured to receive the sheath portion 10b of the optical fiber 10 are formed.

A refractive index matching material is injected on the end faces of the optical fibers.

Next, the insertion member 11 is removed and consequently the flat spring 9 urges the base 6 and the covers 7 and 8 thereby to hold the butt-connection part P of the optical fibers as well as the sheath portion 10b of the optical fiber 10.

Figure 7A:
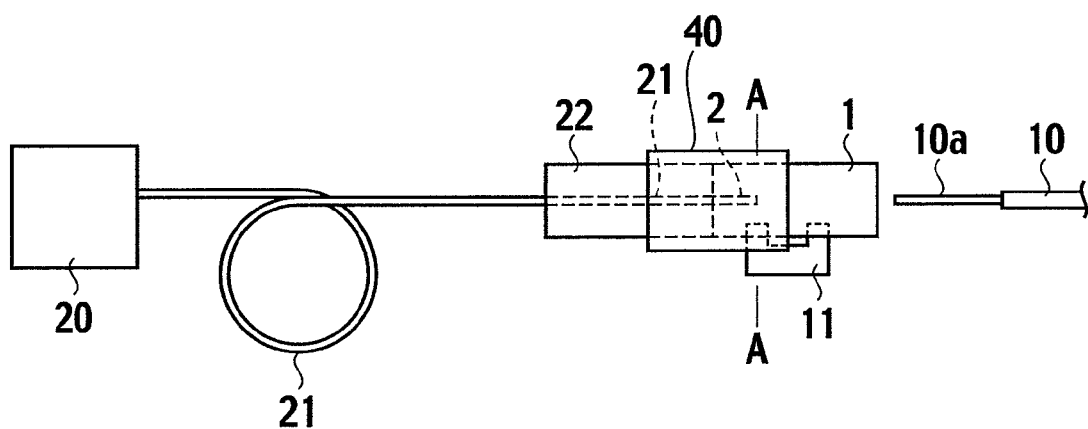
FIGS. 7A and 7B are views each showing a state in confirming an butt-connection state of optical fibers in the optical connector shown in FIG. 3, FIG. 7A showing a state before the optical fibers abut on each other, FIG. 7B showing a state after the optical fibers abut on each other.
Figure 7B:
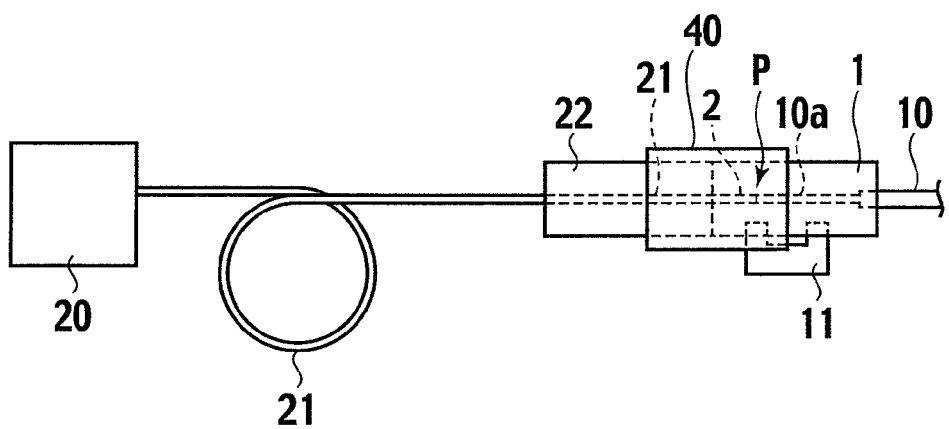
Figure 8:
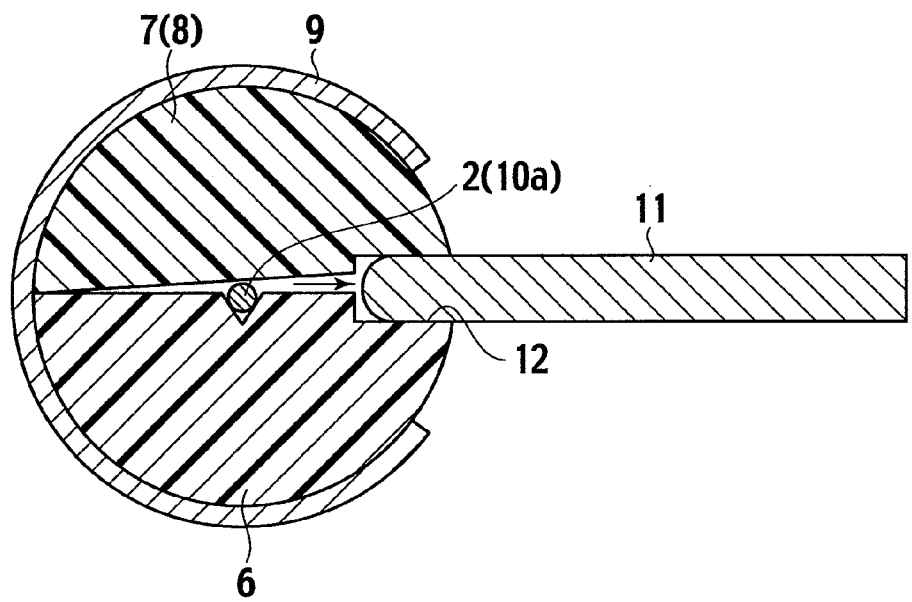
FIG. 8 is an enlarged cross-sectional view taken along the line A-A in FIG. 7A (equivalent to a cross-sectional view taken along the line A-A in FIG. 5).

With reference to FIGS. 7A and 7B, description will be given of procedures for confirming whether or not the optical fiber 2 and the bare optical fiber 10a are properly butted and connected to each other in installation of the optical connector 1.

As shown in FIG. 7A, an apparatus for confirming connection of the optical fibers in the optical connector according to this embodiment of the present invention includes a light source 20, an optical connector 22, an optical adapter (optical connector adapter) 40 and an optical fiber 21.

As shown in FIG. 7A, the optical fiber (first optical fiber) 21 has its one end connected to the light source 20 and has the other end connected to the optical connector 22. The optical fiber 21 may have a length at which a cladding mode caused by incident light disappears. The exemplary length thereof is 100 cm to 200 cm in consideration of operability and the like. The optical connector fits to the optical connector 1 into which the optical fiber 10a is not inserted yet. The optical adaptor 40 detachably holds the optical connectors 1, 22 so as to coincide the optical axes of the optical connectors 1, 22, and thus the optical connectors 1, 22 is connected to each other in the optical adaptor 40.

As the optical fiber 21, an optical fiber which easily attenuates cladding mode light is preferably used. The optical fiber having such a characteristic is, for example, a standard single-mode optical fiber which is made of quartz glass. Moreover, the optical fiber 21 is sheathed with, for example, resin or the like and a diameter thereof is, for example, 0.9 mm. Furthermore, the optical fiber 21 may be bent to enhance attenuation of the cladding mode light, as long as light propagation is not disturbed.

Moreover, as the light source 20, it is preferable to use a laser diode (LD) light source which emits light having a wavelength of 650 nm for optical communication or the like.

The light emitted from the light source 20 passes through the optical fiber 21 and enters the optical fiber 2 in the optical connector 1. In this state, the light that has entered the optical fiber 2 exits from a whole area of the end face (core) of the optical fiber 2. Since the insertion member 11 is light transmissive, the light leaks to the outside of the optical connector 1 through the insertion member 11. This leak light has high intensity and the insertion member 11 is visually observed to be considerably bright.

Note that the members that make up the optical connector other than the insertion member 11 may be made of light transmissive resin or the like. In this case, the light can also be confirmed from those other members.

For example, when the members that make up the optical connector are made of a white resin, not only the light transmitted through the insertion member but also red light (wavelength of 650 nm) can be confirmed through the members made of the white resin.

While the light from the light source 20 passes through the optical fiber 21, the cladding mode light is emitted from an outer surface of the optical fiber 21 and mostly disappears around the connection between the optical connectors in the optical adapter 40. Therefore, no or significantly attenuated cladding mode light enters the optical fiber 2 and no or a very small amount of light is emitted from a peripheral surface of the optical fiber 2. Note that the word "mostly" means that it is difficult to completely remove the cladding mode light and thus the cladding mode light that does not virtually affect brightness confirmation that is the object of the present invention may be left. This can be set as a definition of a term "disappearance of the cladding mode light" in the present invention.

Next, as shown in FIG. 7B, the optical fiber 10 is inserted into the optical connector 1 and the optical fiber 2 and the bare optical fiber 10a are allowed to abut on each other.

In this case, when a butt-connection state is good, optical power propagated to the optical fiber 2 from the light source 20 is propagated to the optical fiber 10a without leaking in the butt-connection part P. Therefore, leakage of the optical power to the outside of the optical connector 1 is very small.

Specifically, as described above, no or significantly attenuated cladding mode light enters the optical fiber 2 and most of the optical power exists in the core. Moreover, no or a very small amount of light is emitted from the peripheral surface of the optical fiber 2 that is the bare optical fiber.

Therefore, in the butt-connection part P, there is almost no light (that is background light) other than the leak light from the optical fiber 2. When the butt-connection state of the optical fiber 2 and the bare optical fiber 10a is good, the insertion member 11 is visually observed to be dark (note that the observation focuses on the wedge part 11a).

When it can be confirmed that the butt-connection state is good, the insertion member 11 is pulled out, and the base 6 and the covers 7 and 8 facing the base 6 in the connection mechanism 4 are closed. Moreover, an urging force of the flat spring 9 mechanically fixes the part between the optical fiber 2 and the bare optical fiber 10a and the vicinity thereof.

Meanwhile, the butt-connection state is considered to be bad in any one of the following states: the bare optical fiber 10a is not sufficiently pressed against the optical fiber 2; there is a gap between the end faces of the optical fibers; and any of the end faces of the optical fibers is in bad condition.

When the connection state is bad, the light from the optical fiber 2 leaks from the butt-connection part P. Thus, the light leaks to the outside of the optical connector 1 through the insertion member 11. Therefore, since the insertion member 11 is observed to be bright, the bad butt-connection state of the optical fiber 2 and the bare optical fiber 10a can be confirmed.

In this case, considering that there is almost no background light in the butt-connection part P, there is a significantly large difference in light intensity observed between the good and bad butt-connection states. Therefore, it is possible to clearly confirm whether the butt-connection state is good or bad even in a bright environment.

The insertion member 11 described above integrally includes the two wedge parts 11a and 11b. However, the wedge parts 11a and 11b may be configured to move independently of each other. Specifically, there may be provided two insertion members, each having one wedge part. In this case, the insertion member corresponding to the wedge part 11a is made of a transparent material.

Figure 9:
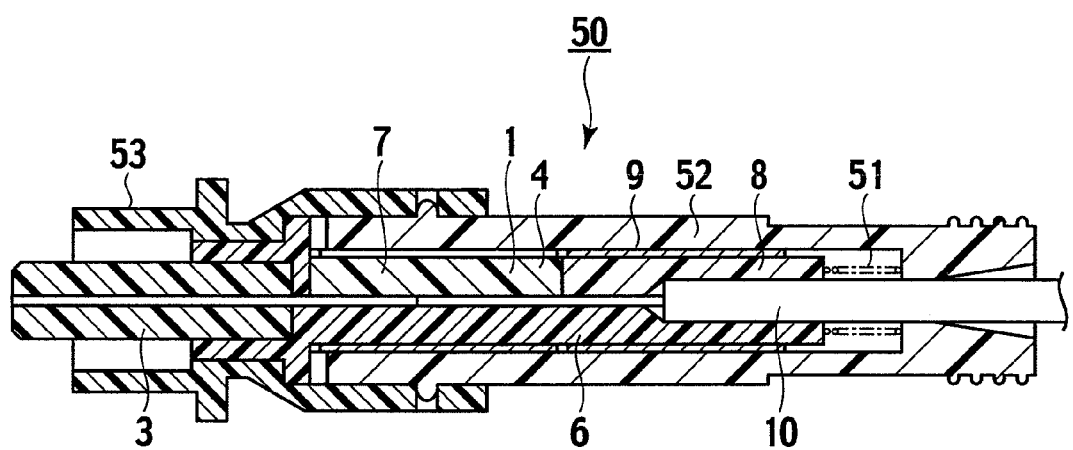
FIG. 9 is a cross-sectional view showing a state where the optical connector shown in FIG. 3 is used.

FIG. 9 shows an example of an optical connector apparatus 50 using the optical connector 1. The optical connector apparatus 50 includes a spring 51, a stop ring 52 and a housing 53 in addition to the optical connector 1. The spring 51 is disposed on a rear end face of the connection mechanism 4 so as to allow the optical fiber 10 to be inserted thereinto. The stop ring 52 is placed over the optical connector 1 from behind the optical connector 1 in a state where the spring 51 is disposed. Therefore, the optical connector 1 is urged forward (in other words, toward the ferrule 3) by the spring 51. Furthermore, the housing 53 is placed over the ferrule 3 and a front portion of the connection mechanism 4.

The optical connector apparatus 50 is detachably held by the optical adapter 40, for example, or the like and is connected to another optical connector in the adapter.

When an assembling tool (opening member) integrally including an insertion member is used as in the case of U.S. Pat. No. 7,346,255, a butt-connection state can also be confirmed in a state where the optical connector 1 is housed in the optical connector apparatus 50. In this case, a slit (not shown) which allows an opening and closing member to pass therethrough is provided in the housing 53.

Second Embodiment

Figure 10:
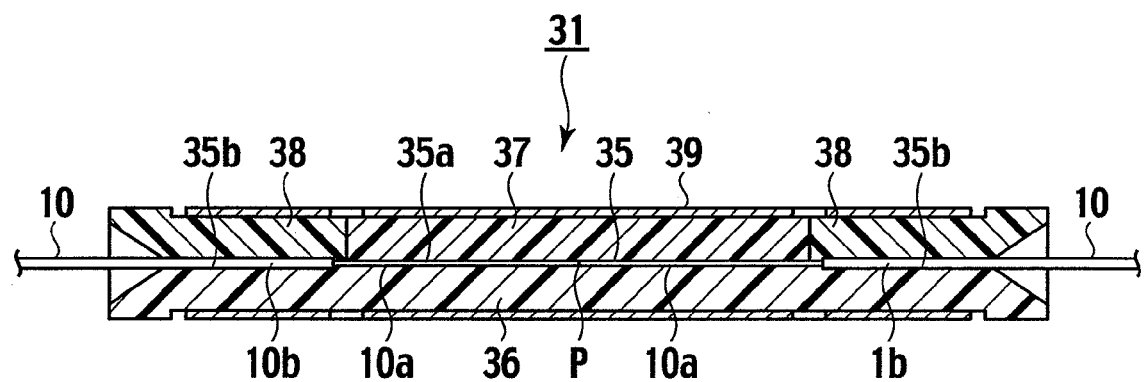
FIG. 10 is a longitudinal cross-sectional view of an optical connector according to an embodiment of the present invention.

FIG. 10 is a longitudinal cross-sectional view of an optical connector according to a second embodiment of the present invention. An optical connector 31 of this embodiment has a connection mechanism configured to mechanically butt and connect two optical fibers 10 to each other. This connection mechanism is called a mechanical splice. The optical connector 31 includes: a base 36 having a positioning groove 35 formed therein; a cover 37 and covers 38 which are all facing the base 36; and a C-shaped or squared C-shaped flat spring 39 for elastically clamping the base 36 and the covers 37 and 38. Furthermore, the positioning groove 35 is constituted of a positioning groove 35a and a positioning groove 35b. In the positioning groove 35b, the optical fiber 10 is disposed. In the positioning groove 35a, a bare optical fiber 10a is disposed, which is exposed by peeling off a sheath of the optical fiber 10.

The cover 37 is disposed between the covers 38. The cover 37 opens and closes a butt-connection part P of the bare optical fibers 10a. The covers 38 are disposed respectively on the two sides of the cover 37, and each open and close a portion in which a sheath portion 10b of the corresponding optical fiber 10 is disposed, the sheath portion 10b being inserted from a corresponding side of the optical connector 31.

Figure 11:
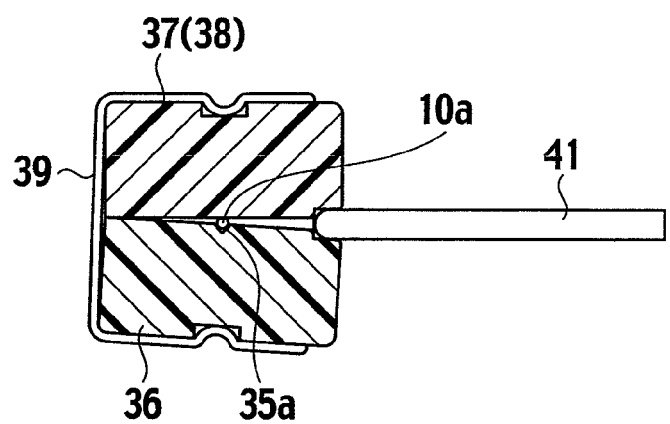
FIG. 11 is a transverse cross-sectional view of the optical connector shown in FIG. 10.

As shown in FIG. 11, an insertion member 41 is inserted so as to open and close a portion between the base 36 and the covers 37 and 38, 38. The insertion member 41 is made of a light transmissive material.

Procedures for confirming a butt-connection state of the optical fiber 10a in installation of the optical connector 31 are basically the same as those described in the first embodiment. Leak light from the butt-connection part P is detected through the insertion member 41.

Other Embodiments

In both of the embodiments described above, the insertion member 11 is made of a light transmissive material, and the leak light from the insertion member 11 is detected to confirm the butt-connection state. However, as described above, the leak light is not necessarily limited to that from the insertion member 11.

For example, in the first embodiment, at least one of the base 6 and the cover 7 in the connection mechanism 4 is made of the light transmissive material and leak light from the butt-connection part P can be observed therefrom. Such an observation can be implemented in the second embodiment by forming at least one of the base 36 and the covers 38 of the light transmissive material. Specifically, the present invention can be applied to an optical connector which has a portion configured to communicate leak light to the outside or which has at least a part thereof formed of an optically transparent material allowing transmission of the leak light.

Moreover, in the above embodiment, the light source of 650 nm is used to visually observe the light intensity of the leak light as bright and dark. The light intensity can also be detected by a light intensity meter. In the case of using the light intensity meter, the light to be detected is not limited to visible light.

Moreover, in the present invention, a quartz optical fiber can be applied as the optical fiber. Furthermore, a surface of the optical fiber may be sheathed with a polyvinyl chloride resin and the like to improve mechanical strength. In the first embodiment, in particular, the optical fiber 21 connecting the light source 20 to the optical connector 22 may have its periphery reinforced with a tensile fiber.

According to the method and apparatus for confirming optical fibers connection according to the present invention, the optical fiber interposed between the optical connector and the light source attenuates cladding mode light. Specifically, while the light from the light source passes through the optical fiber, the cladding mode light is emitted from cladding to the outside. Thus, the cladding mode light does not reach the inside of the optical connector or is significantly attenuated.

Therefore, in the abutting part of the optical fibers in the optical connector, the leak light from the cladding is significantly reduced. When the butt-connection state is good, loss of optical power transmitted from a core of one optical fiber to a core of the other optical fiber and light reflection are significantly reduced. Accordingly, leak light from an abutting end face of the optical fibers is significantly reduced. Thus, a difference in light intensity in the butt-connection part between good and bad butt-connection states is relatively increased. Consequently, it becomes possible to clearly confirm the butt-connection state even in a bright environment during the day.

What is claimed is:

1. A method for confirming optical fibers connection in a connection part in an optical connector, comprising:
   allowing light to pass through a first optical fiber while causing cladding mode light to substantially disappear; and
   detecting a light intensity in the connection part between the first optical fiber and a second optical fiber disposed in the optical connector.

2. The method according to claim 1, wherein
   the first optical fiber is bent when light passes therethrough.

3. The method according to claim 2, wherein
a wavelength of light entering the first optical fiber is 650 nm, and
a length of the first optical fiber is 100 cm to 200 cm.

4. The method according to claim 3, wherein
the first optical fiber is a single-mode optical fiber.

5. The method according to claim 1, wherein
the difference in light intensity is detected through a light transmissive member located in the connection part.

6. The method according to claim 5, wherein
the optical connector includes a ferrule and a third optical fiber inserted into the ferrule, and
light that exits from the first optical fiber enters the second optical fiber through the third optical fiber.

7. The method according to claim 6, wherein
the optical connector has a connection mechanism extending in a direction opposite to that toward a connection end face of the ferrule,
the connection mechanism includes
a base,
first and second covers openably and closably facing the base and
a flat spring for elastically clamping the base and all the covers,
a positioning groove for the optical fiber is formed in the base,
the first cover is located so as to open and close the connection part,
the second cover is located so as to cover a sheath portion of the second optical fiber, and
the light transmissive member is an insertion member and is inserted between the base and the first and second covers so as to open and close the base and the covers.

8. The method according to claim 6, wherein
the optical connector has a connection mechanism extending in a direction opposite to that toward a connection end face of the ferrule,
the connection mechanism includes
a base,
first and second covers openably and closably facing the base and
a flat spring for elastically clamping the base and all the covers,
the light transmissive member is at least one of the base and the first cover,
a positioning groove for the optical fiber is formed in the base,
the first cover is located so as to open and close the connection part, and
the second cover is located so as to cover a sheath portion of the second optical fiber.

9. The method according to claim 5, wherein
the optical connector includes
a base,
first, second, and third covers openably and closably facing the base and
a flat spring for elastically clamping the base and all the covers,
a positioning groove for the optical fiber is formed in the base,
the first cover is located so as to open and close the connection part,
the second cover is located so as to cover a sheath portion of the first optical fiber,
the third cover is located so as to cover a sheath portion of the second optical fiber, and
the light transmissive member is an insertion member and is inserted between the base and the first to third covers so as to open and close the base and the first, second and third covers.

10. The method according to claim 5, wherein
the optical connector includes
a base,
first, second, and third covers openably and closably facing the base and
a flat spring for elastically clamping the base and all the covers,
a positioning groove for the optical fiber is formed in the base,
the first cover is located so as to open and close the connection part,
the second cover is located so as to cover a sheath portion of the first optical fiber,
the third cover is located so as to cover a sheath portion of the second optical fiber, and
the light transmissive member is the base and the first cover.

* * * * *